United States Patent
Lee et al.

(10) Patent No.: US 7,323,800 B2
(45) Date of Patent: Jan. 29, 2008

(54) OUTER STATOR FOR RECIPROCATING MOTOR AND MANUFACTURING METHOD THEREOF

(75) Inventors: Hyuk Lee, Gyeonggi-Do (KR); Sang-Sub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 11/124,274

(22) Filed: May 9, 2005

(65) Prior Publication Data

US 2006/0091737 A1 May 4, 2006

(30) Foreign Application Priority Data

Nov. 1, 2004 (KR) ...................... 10-2004-0088009

(51) Int. Cl.
*H02K 1/18* (2006.01)
*H02K 41/00* (2006.01)
*H02K 33/00* (2006.01)
*H02K 35/00* (2006.01)

(52) U.S. Cl. .......................... 310/218; 310/12; 310/14; 310/15; 310/216; 310/258

(58) Field of Classification Search ................ 310/12, 310/14, 15, 216, 218, 254, 194, 257, 258, 310/259; 417/417

See application file for complete search history.

(56) References Cited

U.S. PATENT DOCUMENTS

| | | | | |
|---|---|---|---|---|
| 3,591,819 A | * | 7/1971 | Laing .......................... 310/217 |
| 4,538,086 A | * | 8/1985 | Marsh et al. ................ 310/258 |
| 5,175,457 A | * | 12/1992 | Vincent ........................ 310/15 |
| 6,060,810 A | * | 5/2000 | Lee et al. .................... 310/254 |
| 6,077,054 A | * | 6/2000 | Lee et al. .................... 417/417 |
| 6,573,624 B2 | * | 6/2003 | Park ............................ 310/12 |
| 6,628,018 B2 | * | 9/2003 | Song et al. ................... 310/15 |
| 6,946,771 B2 | * | 9/2005 | Cros et al. .................. 310/257 |
| 6,956,315 B2 | * | 10/2005 | Yoon et al. ................. 310/254 |
| 7,135,802 B2 | * | 11/2006 | Seki et al. .................. 310/257 |
| 2002/0070627 A1 | * | 6/2002 | Ward et al. ................. 310/254 |
| 2004/0169432 A1 | | 9/2004 | Park |
| 2004/0169433 A1 | | 9/2004 | Park |

OTHER PUBLICATIONS

U.S. Appl. No. 10/985,936, to H. J. Shin, filed Nov. 12, 2004.
U.S. Appl. No. 11/087,607, to H. Lee, filed Mar. 24, 2005.
U.S. Appl. No. 11/140,743, to S.J. Kim, Jun. 1, 2005.

* cited by examiner

*Primary Examiner*—Tran Nguyen
(74) *Attorney, Agent, or Firm*—Greenblum & Bernstein, P.L.C.

(57) ABSTRACT

An outer stator of a reciprocating compressor comprises: a bobbin formed as a ring shape and provided with a winding coil therein; an outer stator frame coupled to an outer circumferential surface of the bobbin and formed of a magnetic body in which a flux flows; a plurality of first core blocks coupled to the outer stator frame and positioned radially at one side of the bobbin; and a plurality of second core blocks coupled to the outer stator frame, facing the first core blocks, and positioned at the other side of the bobbin. Accordingly, deformation which may occur during manufacturing can be prevented, and a size of a motor can be minimized.

8 Claims, 6 Drawing Sheets

OUTER STATOR FOR RECIPROCATING MOTOR AND MANUFACTURING METHOD THEREOF

BACKGROUND OF THE INVENTION

1. Field of the Invention

The present invention relates to a stator for a reciprocating motor, and particularly, to a stator of a reciprocating motor capable of preventing deformation of a stator, which occurs during its fixation, and of reducing a size of a motor by widening an area of a magnetic flux.

2. Description of the Background Art

In general, a motor is used as a core driving source for most electrical and electronic products such as compressors, washing machines and electric fans. A motor receives electric energy and converts the electric energy into kinetic energy. There are a lot of kinds of motors, and it may be classified into a rotary motor that converts electric energy to a rotary force, a reciprocating motor that converts electric energy to a linear movement force, and the like.

Under circumstances of requiring a linear movement, the reciprocating motor which can implement a linear movement without any special equipment is suitable.

One example of such a reciprocating motor is shown in FIGS. 1 and 2. FIG. 1 is a front view showing one example of a conventional reciprocating motor, and FIG. 2 is its side view. As shown, the conventional reciprocating motor includes: a stator assembly 10 forming a flux, and a mover assembly 20 linearly reciprocating according to the flux of the stator assembly 10.

The stator assembly 10 includes: an outer stator 11 positioned outside the mover assembly 20 and formed as a cylindrical shape; and an inner stator 12 disposed inside the outer stator 11 at a certain distance (t) therebetween and formed as a cylindrical shape.

The outer stator 11 includes: a bobbin 13 in which a winding coil 30 is inserted; a plurality of core blocks 14 formed by laminating lamination sheets 17 having predetermined shapes on an outer surface of the bobbin 13 in a circumferential direction thereof; and a molding body 15 formed by molding outer surfaces of the core blocks 14 and an outer surface of the bobbin 13, which is not surrounded by the core blocks 14, for fixing the core blocks 14 to the bobbin 13.

The bobbin 13 is a hollow cylindrical body and is made of an insulation material such as plastic.

The core block 14 is formed in the following manner. "⌐" shaped lamination sheets 17 are laminated and then are coupled to one side of the bobbin 13, and other lamination sheets 17 are laminated and then are coupled to the other side of the bobbin, facing the above-mentioned laminations sheets coupled to one side of the bobbin 13, so that a "⊓" shaped core block 14 is formed. A plurality of core blocks 14 formed in such a manner are disposed in a circumferential surface of the bobbin.

An inner surface and an outer surface of each core block 14 become curved surfaces by a plurality of lamination sheets 17. The inner surfaces of the core blocks 14 coupled to the bobbin 13 form a circle, and their outer circumferential surfaces maintain regular intervals therebetween.

The mover assembly 20 includes: a mover body 21 movably disposed in an air gap between the outer stator 11 and the inner stator 12; and a plurality of magnets 22 fixed on an outer circumferential surface of the mover body 21 at regular intervals.

The conventional reciprocating motor as described above is operated in the following manner.

When a current is applied to a winding coil 30, a flux is formed around the coil 30. The flux forms a closed loop as it flows to the inner stator 12 along the outer stator 11. At this time, because the magnet 22 of the mover assembly 20 is put on the flux formed by the coil 30, the magnet 22 interacts with the flux of the winding coil 30 and thereby is pulled or pushed along a direction of the flux, allowing a linear reciprocation of the mover body 21.

In order to manufacture the reciprocating motor, first, a steel plate is cut into a plurality of laminations sheets 17 having predetermined shapes, and the plurality of lamination sheets 17 are laminated to thereby form a core block 14.

Next, a plurality of core blocks 14 are disposed on an outer surface of the bobbin 13 in which the winding coil 30 is inserted. Then, the bobbin 13 and the core block 14 are put in a special mold, and an over-molding is performed thereon by injecting a molding agent therein using a die casing method or an injection molding method. In such a manner, a molding body 15 is formed on an outer circumferential surface of each core block, thereby completing the outer stator 11. After that, an inner stator 12 is disposed at a certain distance (t) between itself and the outer stator 11, thereby completing the stator assembly 10.

FIG. 3 is a sectional view showing a coupling state of the outer stator of the conventional reciprocating motor. As shown, the reciprocating motor has a problem in that the core block 14 is deformed by being pressed in a central direction by molding pressure generated during injection of a molding agent and by contraction generated in hardening of a molding agent. For this reason, a distance (t) between the outer stator 11 and the inner stator 12 gets narrowed, thereby undesirably causing collision between the stator and the mover. Therefore, reliability and efficiency of the motor are degraded. Also, because the injection molding method is used in an over molding process in which a winding coil is coated with an insulation material, a molded object is contracted in cooling, causing a dimensional error, and ununiformity of a product is generated by a temperature of a mold, which increases a rate of defection. Also, a temperature of a mold and a pressure condition in an initial molding setting should be set. Therefore, there are several problems such as complicated manufacturing processes and an increased manufacturing cost.

Also, because there is an empty space between the core blocks, a width of each core block 14 should be widened to widen an area of a magnetic flux. Therefore, a size of the motor should be undesirably enlarged as much as the widened width.

SUMMARY OF THE INVENTION

Therefore, an object of the present invention is to provide a stator of a reciprocating motor capable of preventing deformation of an outer stator, which is generated due to a molding material, and of reducing a size of a motor by reducing an area of a core block while maintaining an area of a magnetic flux the same.

To achieve these and other advantages and in accordance with the purpose of the present invention, as embodied and broadly described herein, there is provided an outer stator of a reciprocating compressor comprising: a bobbin formed as a ring shape and provided with a winding coil therein; an outer stator frame coupled to an outer circumferential surface of the bobbin and formed of a magnetic body in which a flux flows; a plurality of first core blocks coupled to the outer stator frame and positioned radially at one side of the bobbin; and a plurality of second core blocks coupled to the outer stator frame, facing the first core blocks, and positioned at the other side of the bobbin.

To achieve these and other advantages and in accordance with the purpose of the present invention, as embodied and broadly described herein, there is provided a method for manufacturing an outer stator of a reciprocating motor comprising: manufacturing first core blocks and second core blocks by laminating steel plates having predetermined shapes, and manufacturing an outer stator frame by sintering soft magnetic composites; winding a coil on a ring-shaped bobbin plural times, and inserting the outer stator frame upon the bobbin by line-contacting an outer circumferential surface of the bobbin with an inner circumferential surface of the outer stator frame; inserting the first core blocks and the second core blocks in block mounting grooves provided at both sides of the outer stator frame to thereby radially arrange the first and second core blocks; and fixing the first core blocks and the second core blocks to the outer stator frame.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
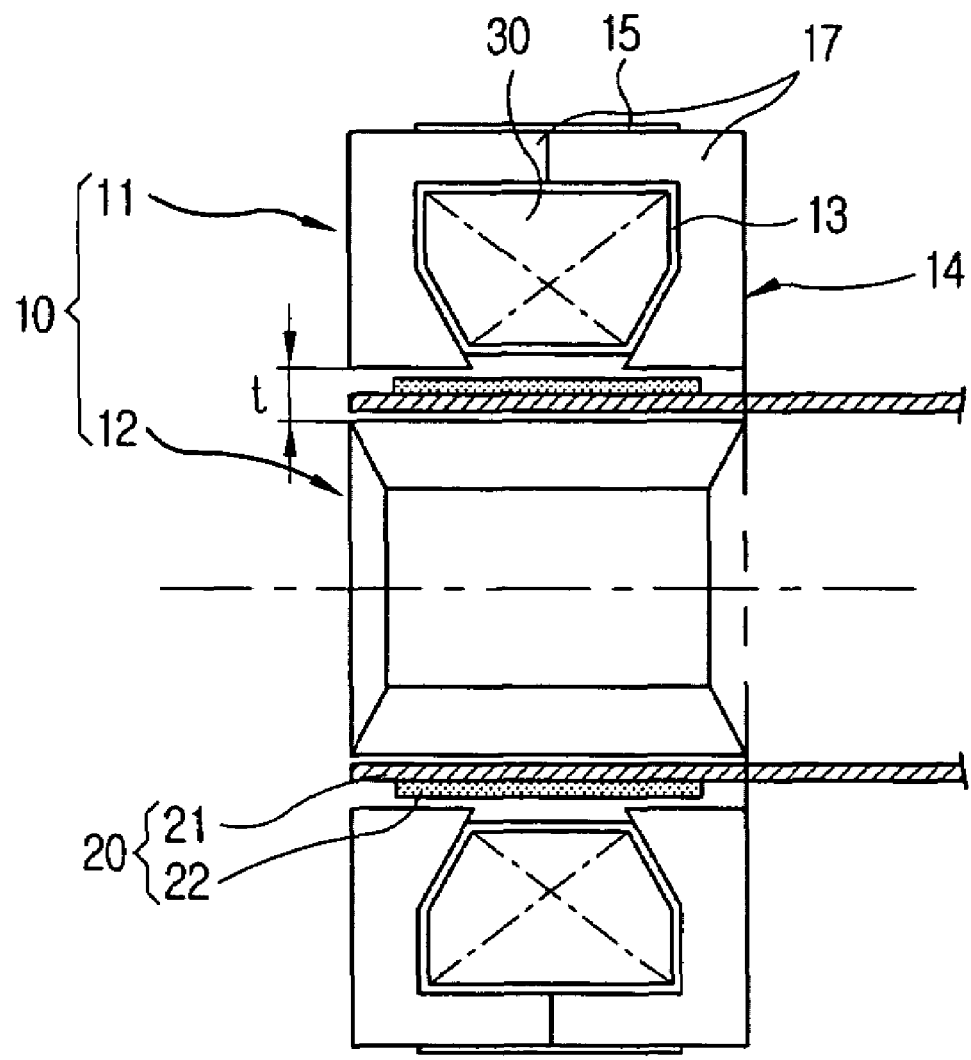
FIG. 1 is a front view showing one example of a conventional reciprocating motor.
Figure 2:
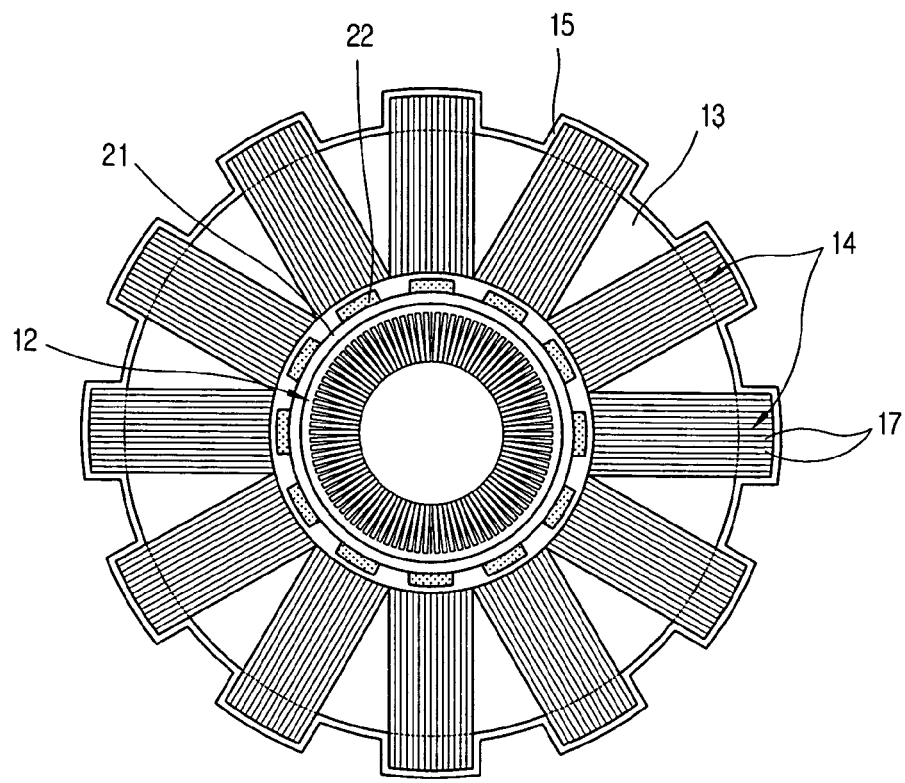
FIG. 2 is a side view showing one example of the conventional reciprocating motor.
Figure 3:
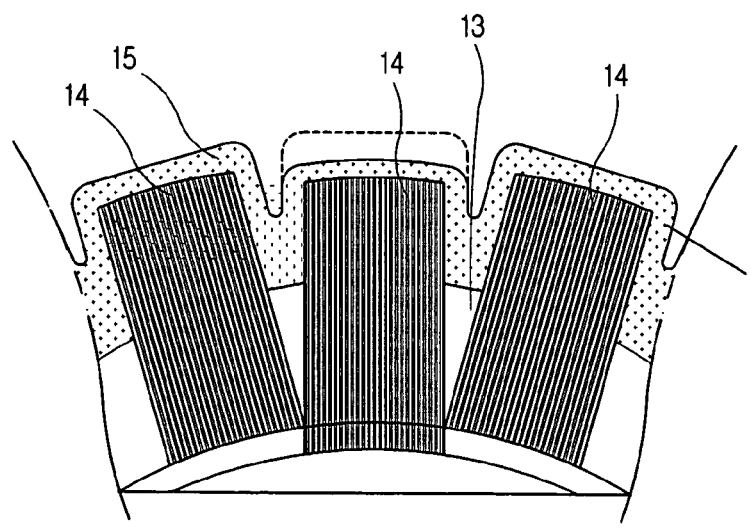
FIG. 3 is a sectional view showing a coupling state of an outer stator of the conventional reciprocating motor.
Figure 4:
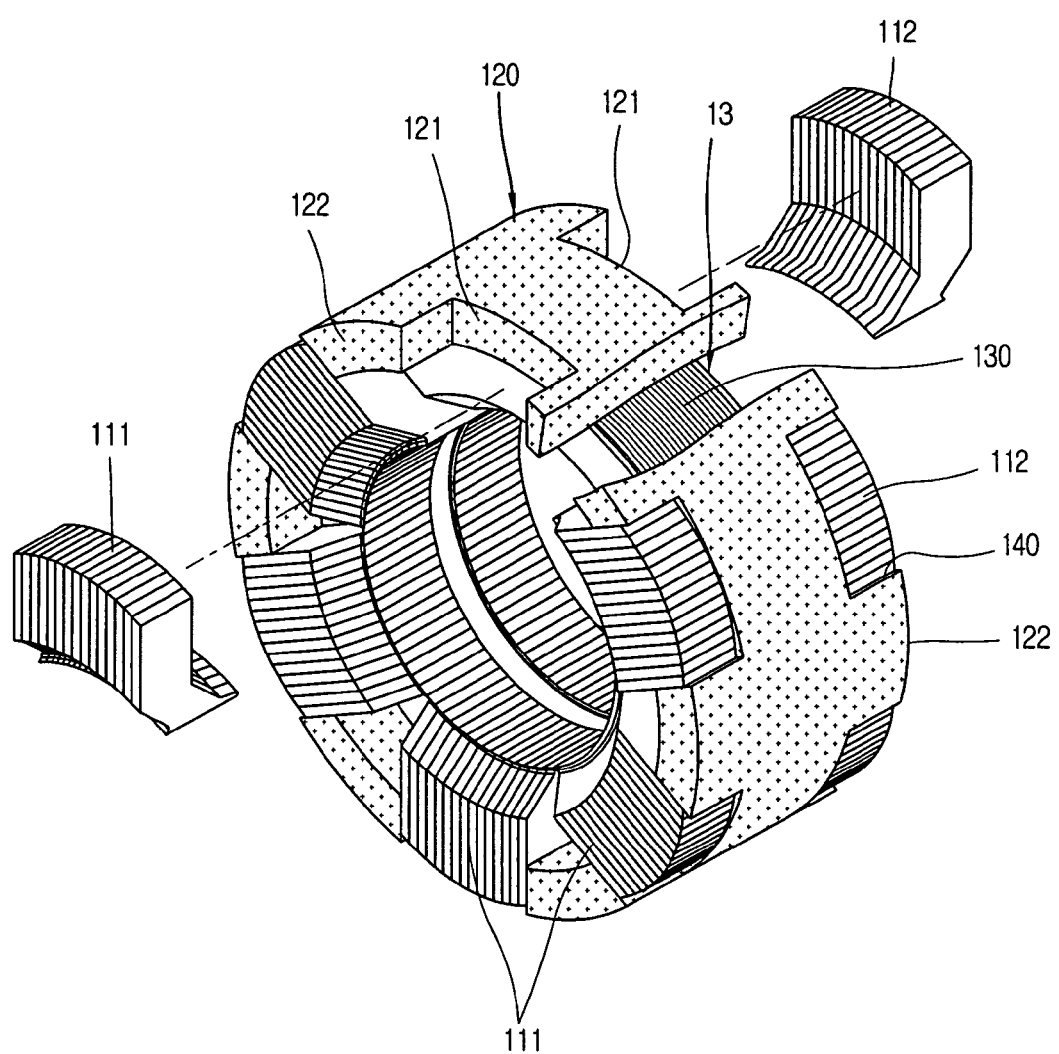
FIG. 4 is a partially-exploded perspective view showing an outer stator of a reciprocating motor in accordance with the present invention.

FIG. 4 is a partially-exploded perspective view showing an outer stator of a reciprocating motor in accordance with the present invention.

As shown, the outer stator of the reciprocating motor in accordance with the present invention includes: a bobbin 13 formed as a ring shape and provided with a winding coil 130 therein; an outer stator frame 120 coupled to an outer circumferential surface of the bobbin 13 and formed of a magnetic body in which a flux flows; a plurality of core blocks 111 coupled to the outer stator frame 120 and radially positioned at one side of the bobbin 13; a plurality second core blocks 112 coupled to the outer stator frame 120, facing the first core blocks 111, and positioned at the other side of the bobbin 13.

The bobbin 13 is formed as a ring shape whose outer circumferential surface is opened and is made of an insulation material such as plastic. A coil 130 is wound plural times in the bobbin 13.

The outer stator frame 120 is formed as a ring shape and covers the opened outer circumferential surface of the bobbin 13. At this time, preferably, the bobbin 13 line-contacts with an inner circumferential surface of the outer stator frame 120.

Both sides of the outer stator frame 120 are formed as a concavo-convex form. Thus, the first core blocks 111 and the second core blocks 112 are inserted in concave portions and both sides of each core block are in contact with convex portions, thereby widening an area of magnetic flux. In other words, block mounting grooves 121 are formed at both sides of the outer stator frame 120 at regular intervals in a circumferential direction, so that the first and second core blocks 111 and 112 can be inserted therein. Protrusions 122 are formed between the block mounting grooves 121, and are inserted between the core blocks 111 and 112.

Preferably, the outer stator frame 120 is made by sintering soft magnetic composites. Particularly, the outer stator frame 120 is preferably made by a powder metallurgy.

The soft magnetic composite is a kind of metallic powders and is a magnetic material whose electrical and magnetic properties are improved for the purpose of use in an electromagnetic system such as a motor and the like. Here, the soft magnetic composite is made by coating magnetic powders with an insulating coating material and compressing the powder.

The powder metallurgy refers to the technology for fabricating massive materials and shaped objects by using hardening of metallic powders or composition powders, which happens when they are heated at a high temperature.

Figure 5:
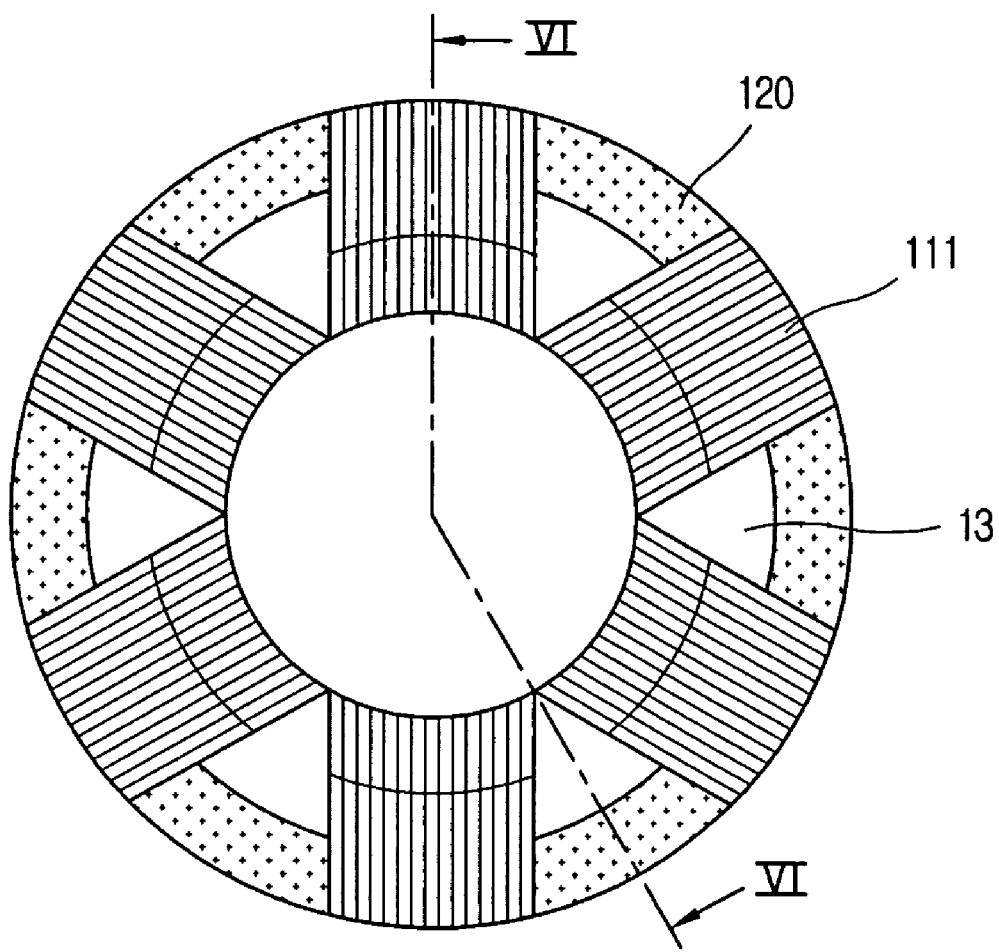
FIG. 5 is a front view showing an outer stator of the reciprocating motor in accordance with the present invention.
Figure 6:
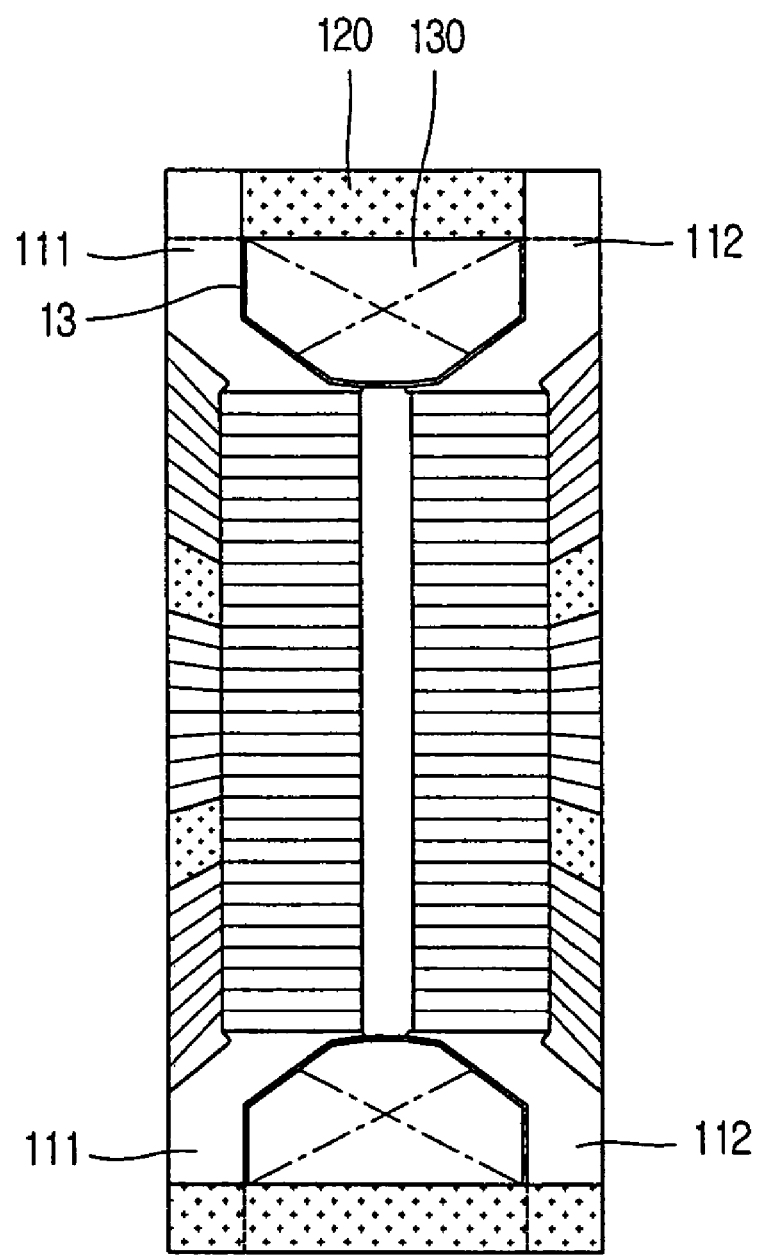
FIG. 6 is a sectional view taken along line VI-VI of FIG. 5.
Figure 7:
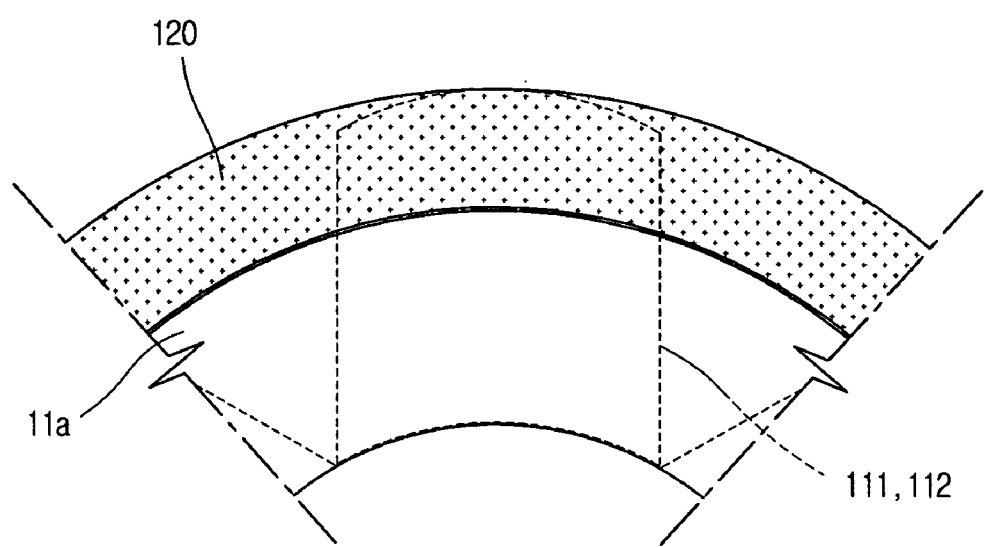
FIG. 7 shows the connection between the bobbin and the stator frame.

FIG. 5 is a front view showing an outer stator of the reciprocating motor in accordance with the present invention, and FIG. 6 is a sectional view taken along line VI-VI of FIG. 5.

When viewed from the front, an inner circumferential surface and an outer circumferential surface of the block mounting groove 121 are the same in length while the protrusion 122 is formed as a fan shape.

The first and second core blocks 111 and 112 are made by laminating lamination sheets having rough "1" shapes, and then are inserted in the block mounting groove 121. At this time, an inner surface of each core block comes in contact with side surfaces of the outer stator frame 120 and the bobbin 13.

The inner surfaces of the core blocks 111 and 112 coupled to the bobbin 13 form a circle, and their outer surfaces maintain regular intervals therebetween. The inner surface and the outer surface of each core block 111 and 112 have the same circumferential length.

Undescribed reference mark 140 is a welding line.

The operation and the effect of the present invention will now be described.

After a steel plate is cut into a plurality lamination sheets with certain shapes, the plurality of lamination sheets are laminated. At this time, an inner circumferential surface and an outer circumferential surface are formed as an arc shape.

In such a manner, the first and second core blocks 111 and 112 are manufactured. Also, by sintering soft magnetic composites, the outer stator frame 120 is manufactured. Then, a coil is wound plural times on the bobbin 13.

Next, the outer stator frame 120 is inserted upon the bobbin 13 by line-contacting an outer circumferential surface of the bobbin 13 with an inner circumferential surface of the outer stator frame 120. The first and second core blocks 111 and 112 are inserted in the block mounting grooves 121 provided at both sides of the outer stator frame 120, thereby being arranged radially.

Next, a boundary portion where the outer stator frame 120 meets each core block 111 and 112 is welded for the purpose of fixation.

By such a structure, deformation of an outer stator, which is generated because of injection pressure of a molding material in injection molding, can be prevented from occurring, and therefore, a gap between the outer stator and the inner stator can be constantly maintained, thereby improving reliability and stability of the reciprocating motor.

Also, as the protrusion is inserted between the core blocks in a circumferential direction, an area of a magnetic flux is widened, thereby reducing an outer diameter of a motor, or the outer diameter may be maintained and an entire cross sectional area of a coil is increased, thereby reducing copper loss and improving efficiency of the motor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An outer stator of a reciprocating compressor comprising:
   a ring shaped bobbin provided with a winding coil within the bobbin;
   an outer stator frame coupled to an outer circumferential surface of the bobbin;
   a plurality of first core blocks coupled to the outer stator frame and positioned radially at one side of the bobbin;
   a plurality of second core blocks coupled to the outer stator frame, facing the first core blocks, and positioned at another side of the bobbin; and
   wherein the plurality of first and second core blocks are distinct from the outer stator frame.

2. The outer stator of claim 1, wherein the outer stator frame is made by sintering soft magnetic composites.

3. The outer stator of claim 1, wherein the outer stator frame has block mounting grooves at opposing sides, wherein the grooves are provided at regular intervals in a circumferential direction so that the first core blocks and the second core blocks are inserted inside of the grooves.

4. The outer stator of claim 1, wherein the outer stator frame has protrusions provided at opposing sides, the protrusions being positioned between the first core blocks and between the second core blocks so that the protrusions contact side surfaces adjacent core blocks.

5. The outer stator of claim 4, wherein the protrusions have a fan-shape cross section.

6. The outer stator of claim 1, wherein the first core blocks and the second core blocks are formed by laminating lamination sheets having predetermined shapes.

7. The outer stator of claim 1, wherein the bobbin is configured to have an opened outer circumferential surface to be in line-contact with an inner circumferential surface of the outer stator frame.

8. The outer stator of claim 1, wherein the outer stator frame is comprises a magnetic body.

* * * * *